US012752411B2

(12) United States Patent
Konieczka

(10) Patent No.: US 12,752,411 B2
(45) Date of Patent: Oct. 6, 2026

(54) ADAPTER FOR ROTARY HAMMER

(71) Applicant: MILWAUKEE ELECTRIC TOOL CORPORATION, Brookfield, WI (US)

(72) Inventor: Jacob J. Konieczka, Wauwatosa, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 0 days.

(21) Appl. No.: 18/527,695

(22) Filed: Dec. 4, 2023

(65) Prior Publication Data

US 2024/0181618 A1 Jun. 6, 2024

Related U.S. Application Data

(60) Provisional application No. 63/386,018, filed on Dec. 5, 2022.

(51) Int. Cl.
*B25D 17/00* (2006.01)
*B25D 16/00* (2006.01)

(52) U.S. Cl.
CPC ........... *B25D 17/005* (2013.01); *B25D 16/00* (2013.01); *B25D 2250/095* (2013.01)

(58) Field of Classification Search
CPC ... B23B 45/003; B23B 2231/04; B23Q 5/045; B23Q 5/046; B25D 16/00; B25D 17/005; B25D 2250/095; B25F 3/00; B21J 15/20
See application file for complete search history.

(56) References Cited

U.S. PATENT DOCUMENTS

| | | | | | |
|---|---|---|---|---|---|
| 1,042,736 | A * | 10/1912 | Wildmo | B25B 17/00 | 81/57.3 |
| 1,112,730 | A | 10/1914 | Trivers | | |
| 2,349,156 | A * | 5/1944 | Fischer | B23Q 11/0046 | 408/124 |
| 2,465,309 | A | 3/1949 | Happe et al. | | |
| 2,553,688 | A | 5/1951 | Thompson | | |
| 2,777,340 | A * | 1/1957 | Hettwer | B23Q 5/046 | 408/124 |
| 2,780,942 | A | 2/1957 | Babcock | | |
| 3,027,789 | A * | 4/1962 | Bochman, Jr. | B25B 21/002 | 81/57.3 |
| 3,613,431 | A * | 10/1971 | Meyer | F16B 19/04 | 29/523 |
| 3,961,671 | A * | 6/1976 | Adams | E02D 5/801 | 52/741.11 |

(Continued)

FOREIGN PATENT DOCUMENTS

| | | | |
|---|---|---|---|
| CN | 204076204 | U | 1/2015 |
| CN | 104924132 | A | 9/2015 |

(Continued)

*Primary Examiner* — Shelley M Self
*Assistant Examiner* — David G Shutty
(74) *Attorney, Agent, or Firm* — Michael Best & Friedrich LLP

(57) ABSTRACT

A rotary hammer includes a housing having a chuck, an anvil moveable axially within the housing, an adapter removably coupled to the chuck. The adapter includes an input shaft that receives axial force from the anvil and a drill bit configured to impact a workpiece. The input shaft defines an input axis, and the drill bit defines an output axis, the input axis being spaced from the output axis.

13 Claims, 6 Drawing Sheets

(56) References Cited

U.S. PATENT DOCUMENTS

| | | | | |
|---|---|---|---|---|
| 4,099,446 | A * | 7/1978 | Harlin | B23Q 5/045 451/238 |
| 4,346,767 | A * | 8/1982 | Vaughan | B25D 17/00 173/109 |
| 4,662,815 | A | 5/1987 | Zimmer | |
| 4,669,551 | A * | 6/1987 | Lippacher | B25D 16/00 173/109 |
| 4,751,970 | A | 6/1988 | Hecker et al. | |
| 5,028,181 | A * | 7/1991 | Jenkins | B23Q 5/045 433/128 |
| 5,161,437 | A * | 11/1992 | Yasutomi | B25B 13/488 81/57.3 |
| 5,350,027 | A * | 9/1994 | Mauch | E21B 7/021 173/217 |
| 5,553,519 | A * | 9/1996 | Pettit, Jr. | B25B 21/002 81/475 |
| 5,598,893 | A * | 2/1997 | Carlson | E04H 17/263 173/217 |
| 5,863,159 | A | 1/1999 | Lasko | |
| 7,124,843 | B2 | 10/2006 | Hulkkonen et al. | |
| 7,871,227 | B2 | 1/2011 | Adamczak et al. | |
| 8,065,936 | B2 * | 11/2011 | Tutino | B25B 17/02 81/57 |
| 8,281,690 | B2 | 10/2012 | Badiali | |
| 8,360,439 | B2 | 1/2013 | Hirt et al. | |
| 8,448,535 | B2 * | 5/2013 | Wang | B25B 23/0028 30/500 |
| D692,742 | S | 11/2013 | Wenchel | |
| 8,650,992 | B2 | 2/2014 | Neitzell et al. | |
| 8,671,804 | B2 | 3/2014 | Galat | |
| 9,149,872 | B2 * | 10/2015 | Saur | B23B 31/0261 |
| 9,193,045 | B2 | 11/2015 | Saur et al. | |
| 9,314,852 | B2 | 4/2016 | Santamarina et al. | |
| 9,579,784 | B2 | 2/2017 | Lu et al. | |
| 9,782,187 | B2 | 10/2017 | Zergiebel et al. | |
| 10,011,008 | B2 * | 7/2018 | Herr | B25F 3/00 |
| 10,099,350 | B2 * | 10/2018 | Gates | B25B 17/00 |
| 10,131,037 | B2 * | 11/2018 | Seith | B25F 5/02 |
| 10,252,438 | B2 * | 4/2019 | Myrhum, Jr. | B26F 1/38 |
| 10,478,930 | B2 * | 11/2019 | Saur | B23Q 5/045 |
| 10,478,959 | B2 * | 11/2019 | Brennenstuhl | B23B 45/003 |
| 10,576,593 | B2 | 3/2020 | Mcroberts et al. | |
| 10,723,008 | B2 * | 7/2020 | Kimura | B25F 5/001 |
| 11,034,002 | B2 | 6/2021 | Gordon et al. | |
| 11,034,047 | B2 * | 6/2021 | Myrhum, Jr. | B26D 5/086 |
| 11,370,037 | B2 | 6/2022 | Hunger et al. | |
| 11,389,934 | B2 * | 7/2022 | Lee | B25B 17/00 |
| 11,407,097 | B2 | 8/2022 | Czirjak et al. | |
| 11,673,249 | B2 * | 6/2023 | Reitzig | B21J 15/20 29/243.523 |
| 11,701,789 | B2 * | 7/2023 | Myrhum, Jr. | B26F 1/36 30/362 |
| 11,731,250 | B2 * | 8/2023 | Forsberg | B25B 21/00 81/57 |
| 11,772,242 | B1 * | 10/2023 | Andersson | B25B 23/0021 81/52 |
| 2007/0259723 | A1 | 11/2007 | Bertani | |
| 2008/0196554 | A1 | 8/2008 | Tutino | |
| 2009/0229421 | A1 * | 9/2009 | Bass | B25B 13/481 29/700 |
| 2010/0260563 | A1 * | 10/2010 | Conroy | B23Q 11/1015 408/1 R |
| 2021/0283752 | A1 | 9/2021 | Forsberg et al. | |
| 2022/0193875 | A1 | 6/2022 | Lautenschläger et al. | |
| 2023/0390911 | A1 * | 12/2023 | Carter | B25D 17/02 |
| 2024/0181618 | A1 * | 6/2024 | Konieczka | B25D 16/00 |

FOREIGN PATENT DOCUMENTS

| | | | |
|---|---|---|---|
| CN | 206048102 | U | 3/2017 |
| CN | 114346971 | A | 4/2022 |
| DE | 2451292 | A1 | 5/1976 |
| DE | 29501710 | U1 | 5/1996 |
| DE | 4445597 | A1 | 6/1996 |
| DE | 10109956 | A1 | 11/2001 |
| DE | 102005036642 | B3 | 3/2007 |
| DE | 102009049496 | A1 | 5/2010 |
| DE | 102015200826 | A1 | 7/2016 |
| DE | 102015200828 | A1 | 7/2016 |
| DE | 102015200831 | A1 | 7/2016 |
| DE | 102016202831 | A1 | 8/2016 |
| DE | 102016202541 | A1 | 8/2017 |
| DE | 102016224435 | A1 | 6/2018 |
| DE | 102019113212 | A1 | 11/2020 |
| EP | 0920950 | A1 | 6/1999 |
| EP | 1258321 | A2 | 11/2002 |
| EP | 2383076 | A2 | 11/2011 |
| WO | 9110539 | A1 | 7/1991 |
| WO | 9921686 | A1 | 5/1999 |
| WO | 2010120659 | A1 | 10/2010 |
| WO | 2011033093 | A1 | 3/2011 |
| WO | 2020224469 | A1 | 11/2020 |

* cited by examiner

ADAPTER FOR ROTARY HAMMER

CROSS-REFERENCE TO RELATED APPLICATIONS

This application claims priority to U.S. Provisional Patent Application No. 63/386,018 filed on Dec. 5, 2022, the entire contents of which are incorporated herein by reference.

FIELD OF THE INVENTION

The present invention relates to accessories for power tools, and more particularly to accessories for rotary hammers.

BACKGROUND OF THE INVENTION

Power tools, such as rotary hammers, include an axial impact mechanism having a reciprocating piston disposed within a spindle, a striker that is selectively reciprocable within the spindle in response to reciprocation of the piston, and an anvil that is impacted by the striker when the striker reciprocates toward the tool bit.

SUMMARY OF THE INVENTION

In some aspects, the invention provides a rotary hammer including a housing having a chuck, an anvil moveable axially within the housing, and an adapter removably coupled to the chuck, the adapter including an input shaft that receives axial force from the anvil and a drill bit configured to impact a workpiece. The input shaft defines an input axis, the drill bit defines an output axis, and the input axis is spaced from the output axis.

In other aspects, the invention provides an adapter for use with a power tool. The adapter includes a housing, an input shaft extending from the housing, the input shaft defining an input axis and configured to be coupled to the power tool to receive impacts from the power tool, and a drill bit extending from the housing, the drill bit defining an output axis and configured to receive the impacts from the input shaft. The input axis is spaced apart from and parallel with the output axis.

In further aspects, the invention provides an adapter for use with a power tool. The adapter includes a housing, an input shaft extending from the housing, the input shaft defining an input axis and configured to be coupled to a power tool to receive axial impacts and rotary motion from the power tool, and a gear mechanism positioned within the housing, the gear mechanism including an input gear coupled to the input shaft and an output gear configured to be coupled to a drill bit, the output gear defining an output axis that is spaced apart from and parallel with the input axis. The housing is configured to transmit the axial impacts from the power tool to the drill bit, and wherein the gear mechanism is configured to transmit rotary motion from the power tool to the drill bit.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
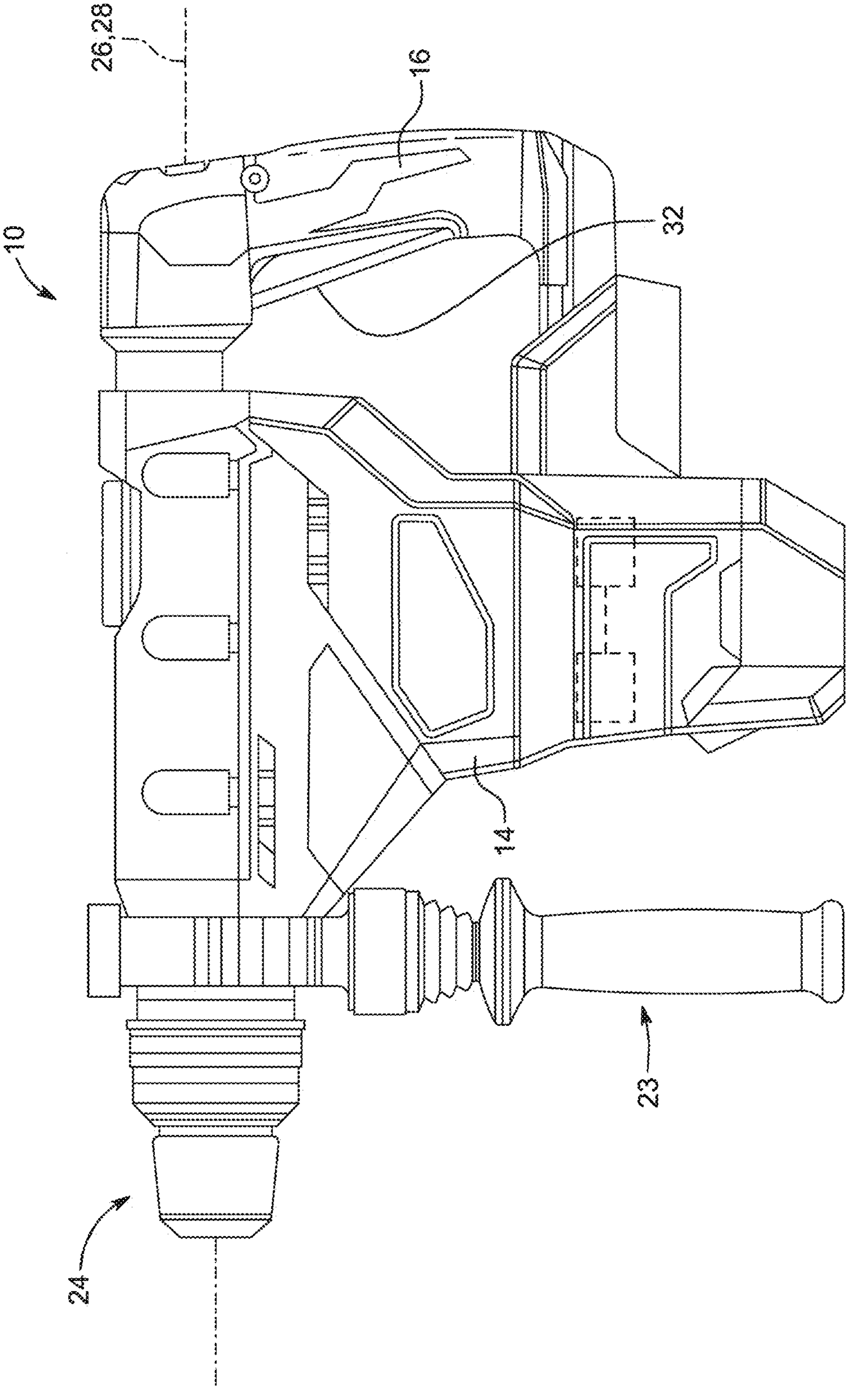
FIG. 1 is a plan view of a rotary hammer.
Figure 2:
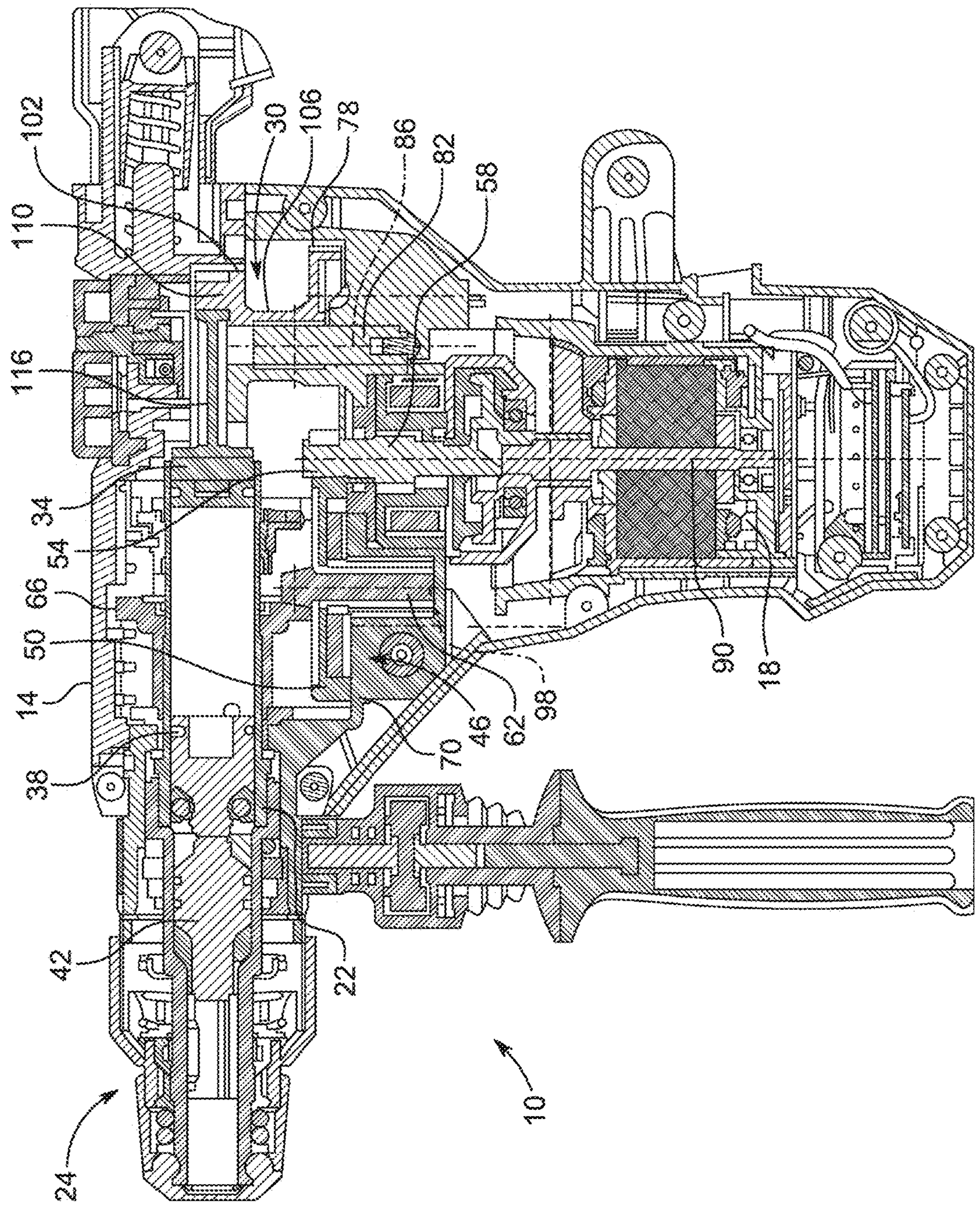
FIG. 2 is a cross-sectional view of the rotary hammer of FIG. 1.

FIGS. 1 and 2 illustrate a rotary power tool, such as rotary hammer 10. The rotary hammer 10 includes a housing 14, a rear handle 16, a motor 18 disposed within the housing 14, and a rotatable spindle 22 coupled to the motor 18 for receiving torque from the motor 18. The handle 16 may be referred to as a D-shaped handle as it forms a closed loop with the housing 14. An auxiliary handle 23 is removably coupled to the front of the housing 14. The housing 14 includes a chuck or quick release mechanism 24 coupled for co-rotation with the spindle 22 to facilitate quick removal and replacement of different tool bits. The tool bit may include a necked section or a groove in which a detent member of the chuck 24 is received to constrain axial movement of the tool bit to the length of the necked section or groove. The rotary hammer 10 defines a tool bit axis 26, which in the illustrated embodiment is coaxial with a rotational axis 28 of the spindle 22.

The motor 18 is configured as a DC motor that receives electrical current from an on-board power source (e.g., a battery, not shown). The battery may include any of a number of different nominal voltages (e.g., 12V, 18V, etc.) and may be configured having any of a number of different chemistries (e.g., lithium-ion, nickel-cadmium, etc.). In some embodiments, the battery is a battery pack removably coupled to the housing 14. Alternatively, the motor 18 may be powered by a remote power source (e.g., a household electrical outlet) through a power cord. The motor 18 is selectively activated by depressing an actuating member, such as a trigger 32, which in turn actuates an electrical switch. The switch is electrically connected to the motor 18 via a top-level or master controller, or one or more circuits, for controlling operation of the motor 18.

In some embodiments, the rotary hammer 10 can produce an average long-duration power output between about 1000 Watts and about 1500 Watts. In other words, the rotary hammer 10 is operable to produce between about 2000 Watts and about 3000 Watts of power over a full discharge of a battery. In some embodiments, the rotary hammer 10 can produce approximately 2100 Watts of power over a full discharge of a battery. In some embodiments, the rotary hammer 10 delivers between 5 N-m and 25 N-m of torque at the tool bit. In other embodiments, the rotary hammer 10 delivers approximately 80 N-m of torque at the tool bit.

The rotary hammer 10 further includes an impact mechanism 30 (FIG. 2) having a reciprocating piston 34 disposed within the spindle 22, a striker 38 that is selectively reciprocable within the spindle 22 in response to reciprocation of the piston 34, and an anvil 42 that is impacted by the striker 38 when the striker reciprocates toward the tool bit. Torque from the motor 18 is transferred to the spindle 22, and therefore the chuck 24, by a transmission 46. The transmission 46 includes an input gear 50 engaged with a pinion 54 on an intermediate shaft 58 that is selectively driven by the motor 18, an intermediate pinion 62 coupled for co-rotation with the input gear 50, and an output gear 66 coupled for co-rotation with the spindle 22 and engaged with the intermediate pinion 62. The output gear 66 is secured to the spindle 22 using a spline-fit or a key and keyway arrangement, for example, that facilitates axial movement of the spindle 22 relative to the output gear 66 yet prevents relative rotation between the spindle 22 and the output gear 66. A clutch mechanism 70 is incorporated with the input gear 50 to limit the amount of torque that may be transferred from the motor 18 to the spindle 22.

The impact mechanism 30 is driven by another input gear 78 that is rotatably supported within the housing 14 on a stationary intermediate shaft 82, which defines a central axis 86 that is offset from a rotational axis 90 of the intermediate shaft 58 and pinion 54. A bearing (not shown) (e.g., a roller bearing, a bushing, etc.) rotatably supports the input gear 78 on the stationary intermediate shaft 82. As shown in FIG. 1, the respective axes 86, 90 of the intermediate shaft 82 and intermediate shaft 58 are parallel. Likewise, respective axes 90, 98 of the intermediate shaft 58 and the intermediate pinion 62 are also parallel. The impact mechanism 30 also includes a crank shaft 102 having a hub 106 and an eccentric pin 110 coupled to the hub 106. The hub 106 is rotatably supported on the stationary shaft 82 above the input gear 78 by a bearing (not shown) (e.g., a roller bearing, a bushing, etc.). The impact mechanism 30 further includes a connecting rod 116 interconnecting the piston 34 and the eccentric pin 110. In other embodiments, instead of the crank shaft 102, hub 106, eccentric pin 110, and connecting rod 116, a wobble bearing and plate could be used to transfer torque from the motor 18 into reciprocation of the piston 34.

Figure 3:
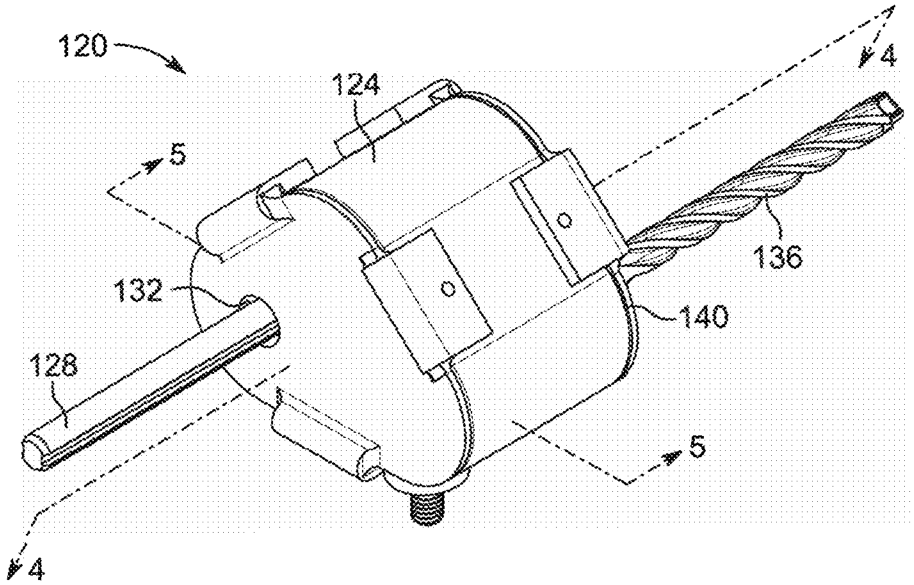
FIG. 3 is a perspective view of an adapter for use with the rotary hammer of FIG. 1.
Figure 4:
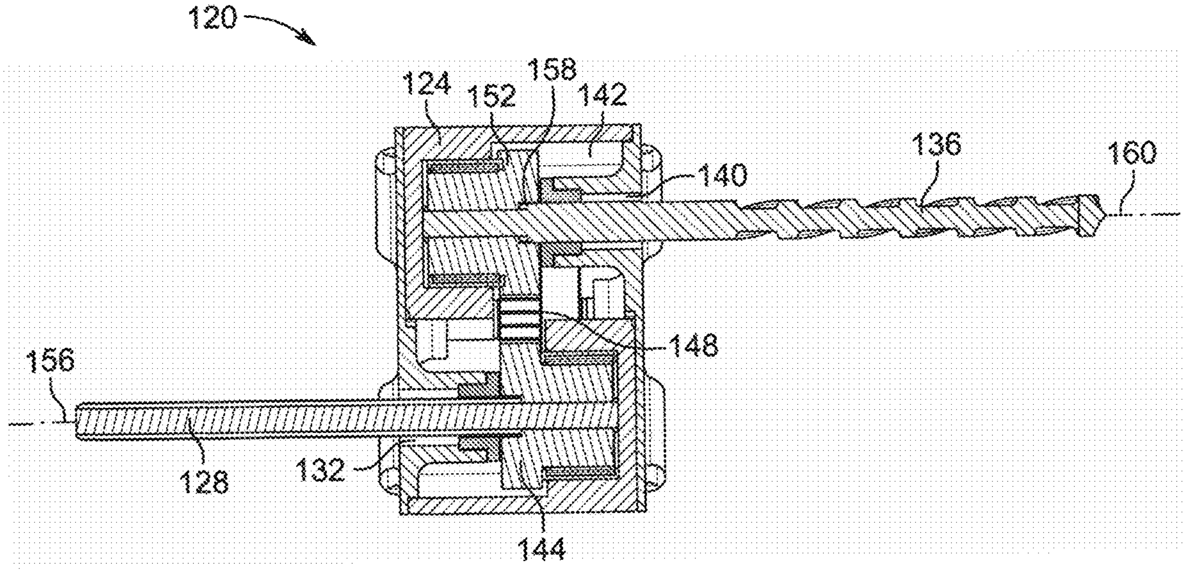
FIG. 4 is a cross-sectional view of the adapter taken along line 4-4 of FIG. 3.
Figure 5:
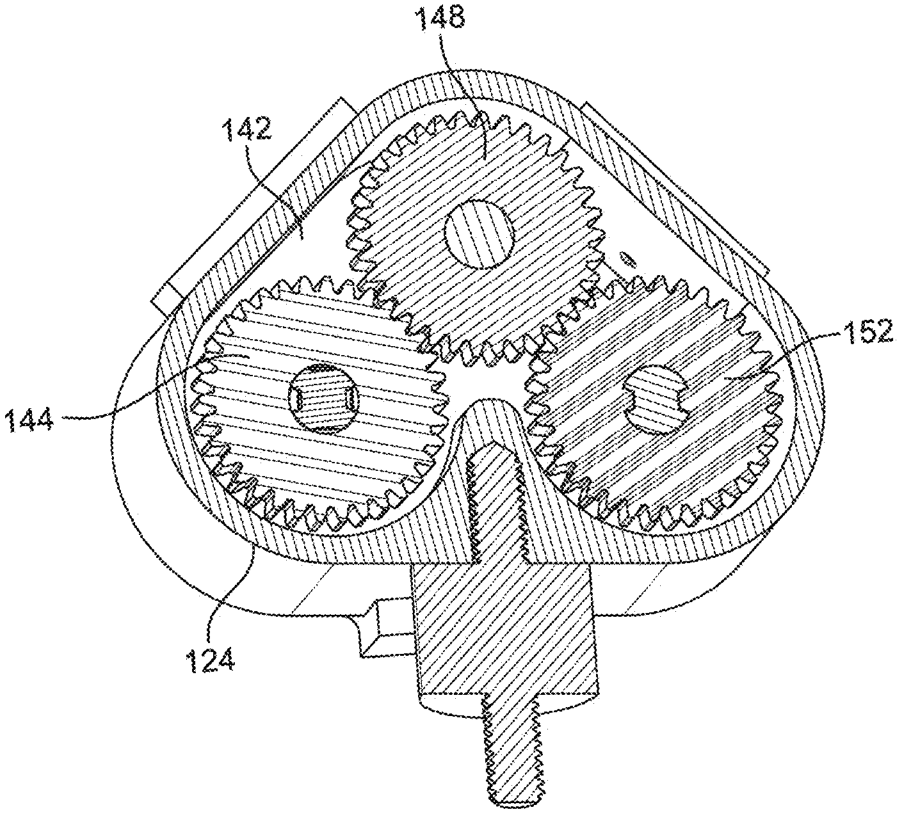
FIG. 5 is a perspective cross-sectional view of the adapter taken along line 5-5 of FIG. 3.

FIGS. 3-5 illustrate an adapter 120 for use with the rotary hammer 10. In other embodiments, the adapter 120 may be used with alternative power tools such as a nailer, drill, or the like. The adapter 120 includes a housing 124, an input shaft 128 extending from an input opening 132 of the housing 124, and a drill bit 136 extending from an output opening 140 of the housing 124. The housing 124 is formed from a singular piece of steel. In other embodiments, the housing 124 may be composed of several pieces. In further embodiments, the housing 124 may be composed of an alternative material such as aluminum, copper, plastic, rubber, or the like.

As shown in FIGS. 4 and 5, the housing 124 includes a hollow center 142 housing a gear mechanism. The illustrated gear mechanism includes an input gear 144 positioned proximate the input opening 132, an intermediate gear 148, and an output gear 152 positioned proximate the output opening 140. The input gear 144 meshes with the intermediate gear 148, which meshes with the output gear 152. In other words, the intermediate gear 148 and the output gear 152 rotate in response to rotation of the input gear 144. The input gear 144, the intermediate gear 148, and the output gear 152 are coupled to the housing 124 such that axial motion of the input, intermediate, and output gears 144, 148, 152 is prevented. In some embodiments, the input, intermediate, and output gears 144, 148, 152 are coupled to the housing 124 via needle bearings. In other embodiments, the input, intermediate, and output gears 144, 148, 152 may be coupled to the housing 124 via alternative securing means. Although the illustrated gear mechanism includes three gears, in other embodiments, the gear mechanism may include fewer or more gears.

The input shaft 128 is coupled to the input gear 144 such that radial and axial movement of the input shaft 128 relative to the input gear 144 is prevented. However, the input shaft 128 may rotate relative to the housing 124. In other words, rotation of the input shaft 128 imparts rotational motion onto the input gear 144, rotating the input gear 144. Additionally, as the input shaft 128 axially moves, axial motion is imparted onto the input gear 144, and therefore onto the housing 124, reciprocally moving the housing 124. The input shaft 128 extends outwardly from the hollow center 142 of the housing 124, through the input opening 132. The input shaft 128 and the input gear 144 co-rotate about an input axis 156, defined by the input shaft 128. In the illustrated embodiment, the input shaft 128 is an SDS-style shaft, such as an SDS shank, an SDS+ shank, or an SDS Max shank. In other embodiments, the input shaft 128 may have other configurations, such as a hex shank with a power groove.

The drill bit 136 is removably coupled to a bore 158 integrally formed with the output gear 152 such that rotation of the output gear 152 imparts rotational motion onto the drill bit 136. In some embodiments, the drill bit 136 is a twist drill bit. In other embodiments, the drill bit 136 may be an alternative type of drill bit (e.g., a spade bit, a step drill bit, a hole saw, etc.). In still other embodiments, the drill bit 136 may be an alternative type of accessory bit, such as a driver bit, a bit holder, an extension adapter, a hole saw arbor, or the like. The drill bit 136 is removably coupled to the bore 158 such that the user may change the drill bit 136 that is received by the bore 158. In other embodiments, the drill bit 136 may be permanently coupled to the bore 158. The drill bit 136 extends outwardly from the hollow center 142, through the output opening 140. The drill bit 136 and the input shaft 128 extend in opposite directions. The output gear 152 and the drill bit 136 co-rotate about an output axis 160, defined by the drill bit 136. The output axis 160 additionally defines an axis along which the drill bit 136 may be inserted and removed from the bore 158. The output axis 160 is parallel with and spaced from the input axis 156. In other words, the output axis 160 is offset from the input axis 156. In some embodiments, the output axis 160 is two inches from the input axis 156, in a direction perpendicular to the axes 156, 160. For example, the output axis 160 may be spaced between 1.5 and 2.5 inches from the input axis 156. In other embodiments, the output axis 160 is less than or more than two inches from the input axis 156.

In use, the input shaft 128 is received by the chuck 24 of the rotary hammer 10. The drill bit 136 is aligned with a workpiece in which a user desires a bore. As the anvil 42 of the rotary hammer 10 imparts an axial force onto the input shaft 128 and the transmission 46 imparts a radial force onto the input shaft 128 via the chuck 24, the adapter 120 correspondingly axially and radially moves the drill bit 136. More specifically, the input, intermediate, and output gears 144, 148, 152 rotate in response to rotation of the input shaft 128, imparting rotational motion onto the drill bit 136. Since three gears are included in the present embodiment, a direction of rotation of the drill bit 136 is the same as a direction of rotation of the input shaft 128. The housing 124 transmits axial movement, or hammering movement, onto the drill bit 136. More specifically, as the axial movement is imparted onto the input shaft 128 by the anvil 42, the input gear 144, and therefore the housing 124, are reciprocally moved. In turn, the housing 124 imparts the axial movement onto the output gear 152, and therefore the drill bit 136. Therefore, the drill bit 136 is reciprocally rotated and axially moved in response to the rotational and axial movement imparted onto the input shaft 128. In turn, the drill bit 136 imparts the rotational and axial movement onto the workpiece, creating a hole in the workpiece.

Since the output axis 160 is spaced from the input axis 156, the adapter 120 allows the user to create a perpendicular hole in a surface that otherwise may need to be angled due to an obstruction. For example, the desired hole may be too close to a suspended pipe in a ceiling or may be too close to a corner of the workpiece.

Figure 6:
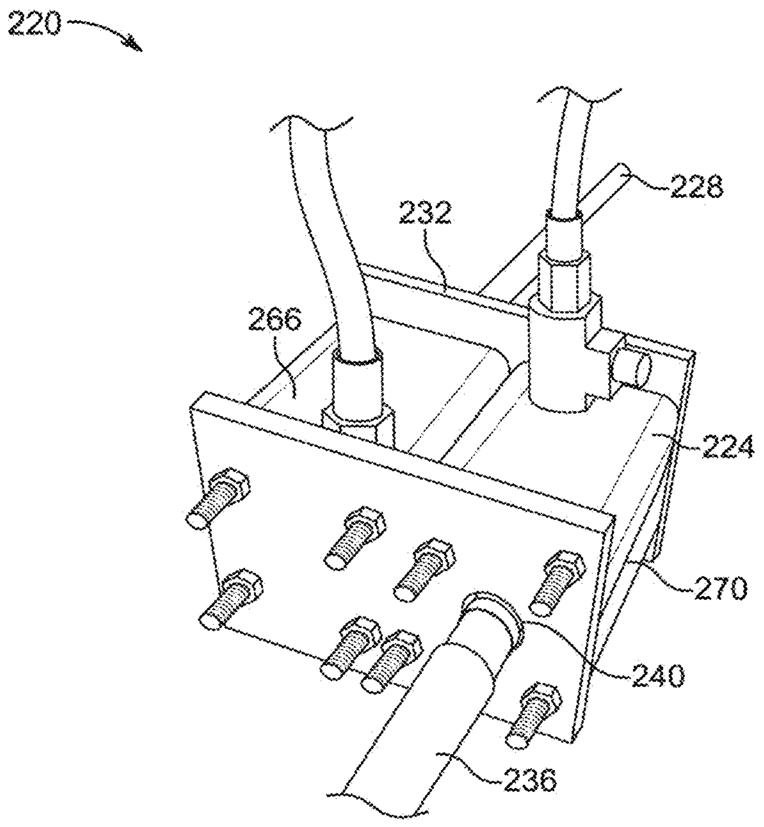
FIG. 6 is a perspective view of an adapter for use with the rotary hammer of FIG. 1, according to another embodiment of the invention.
Figure 7:
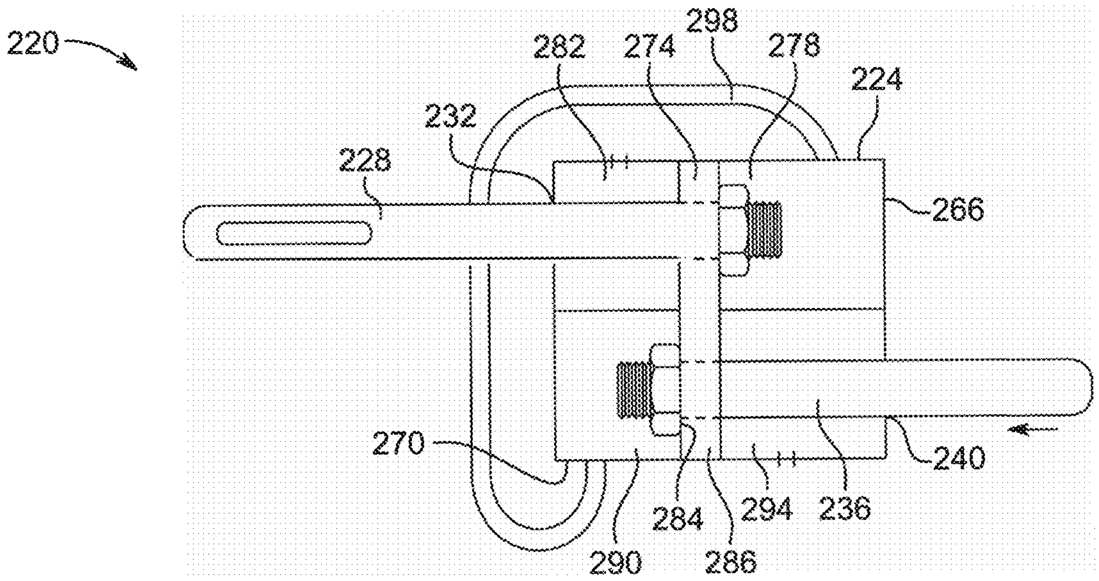
FIG. 7 is a cross-sectional schematic view of the adapter of FIG. 6.

FIGS. 6 and 7 illustrate an adapter 220 according to alternative embodiment of the invention. The adapter 220 is similar to the adapter 120 described above. As such, components of the adapter 220 that are similar to the adapter 120 are annotated with '200' series reference numerals. The adapter 220 includes a housing 224, an input shaft 228 extending from an input opening 232 of the housing 224, and a drill bit 236 extending from an output opening 240 of the housing 224.

With reference to FIG. 6, the housing 224 includes a hydraulic mechanism having an input chamber 266 and an output chamber 270 coupled to the input chamber 266. The input chamber 266 holds a volume that is the same as a volume that the output chamber 270 holds. In other words, the input chamber 266 is the same size as the output chamber 270. In some embodiments, the input chamber 266 and the output chamber 270 may have different volumes. The input chamber 266 and the output chamber 270 are fluidly distinct. Therefore, fluid does not flow between the input chamber 266 and the output chamber 270. The input shaft 228 is housed in the input chamber 266. The input shaft 228 includes an input piston 274 positioned at an end of the input shaft 228, within the input chamber 266. The input piston 274 separates the input chamber 266 into an input pressurized area 278 and an input unpressurized area 282. The input piston 274 seals against an inner surface of the input chamber 266 such that fluid does not flow between the input pressurized area 278 and the input unpressurized area 282. The input unpressurized area 282 is disposed proximate the input opening 232, such that fluid (e.g., air) may escape from the input opening 232. The input pressurized area 278 includes hydraulic fluid disposed therein. As the input piston 274 moves from a top dead center position to a bottom dead center position, a pressure in the input pressurized area 278 increases.

The drill bit 236 is housed in the output chamber 270. The drill bit 236 is removably coupled to a bore 284 disposed in an output piston 286. The output piston 286 is positioned within the output chamber 270. The drill bit 236 is removably coupled to the bore 284 such that the user may change the drill bit 236 that is received by the bore 284. In other embodiments, the drill bit 236 may be permanently coupled to the bore 284. The output piston 286 separates the output chamber 270 into an output pressurized area 290 and an output unpressurized area 294. The output piston 286 seals against an inner surface of the output chamber 270 such that fluid does not flow between the output pressurized area 290 and the output unpressurized area 294. The output unpressurized area 294 is disposed proximate the output opening 240, such that fluid (e.g., air) may escape from the output opening 240.

A fluid line 298 couples the input pressurized area 278 with the output pressurized area 290. In the illustrated embodiment, the fluid line 298 is external to the housing 224. In other embodiments, the fluid line 298 may be internal to the housing 224.

The input shaft 228 defines an input axis 256, and the drill bit 236 defines an output axis 260. The output axis 260 is parallel with and spaced from the input axis 256. In other words, the output axis 260 is offset from the input axis 256. In some embodiments, the output axis 260 is two inches from the input axis 256, in a direction perpendicular to the axes 256, 260. For example, the output axis 260 may be spaced between 1.5 and 2.5 inches from the input axis 256. In other embodiments, the output axis 260 is less than or more than two inches from the input axis 256.

In use, the input shaft 228 is received by the chuck 24 of the rotary hammer 10. The anvil 42 of the rotary hammer 10 moves the input shaft 228 in an axial direction, moving the input piston 274 from the top dead center position to the bottom dead center position. In response, the pressure of the hydraulic fluid increases in the input pressurized area 278, forcing the hydraulic fluid to flow through the fluid line 298 into the output pressurized area 290. The hydraulic fluid in the output pressurized area 290 pushes the output piston 286 from a top dead center position to a bottom dead center position. As the drill bit 236 is axially moved, the drill bit 236 moves toward a workpiece such that the drill bit 236 impacts the workpiece. Thereafter, the input shaft 228 is reciprocally axially moved by the anvil 42. In response, the input piston 274 moves from the bottom dead center to the top dead center position, causing the hydraulic fluid to be forced into the input pressurized area 278, moving the output piston 286 from the bottom dead center position to the top dead center position. The drill bit 236 therefore moves away from the workpiece. This axially movement repeats until a desired hole is formed in the workpiece. In the illustrated embodiment, the adapter 220 solely imparts axial movement onto the drill bit 236, rather than both axial movement and rotational movement. In other embodiments, the adapter 220 may additionally impart rotational movement onto the drill bit 236, similar to the adapter 120.

Since the output axis 260 is spaced from the input axis 256, the adapter 220 allows the user to create a perpendicular hole in a surface that would otherwise need to be angled due to an obstruction. For example, the desired hole may be too close to a suspended pipe in a ceiling or may be too close to a corner of the workpiece.

The above-described rotary hammer 10 is one example of a power tool usable with the adapters 120, 220. In other embodiments, the rotary hammer 10 may have other configurations. Additionally, in some embodiments, the adapters 120, 220 may be usable with different types of power tools, such as a drill/driver that does not include a reciprocating mechanism.

Although the invention has been described in detail with reference to certain preferred embodiments, variations and modifications exist within the scope and spirit of one or more independent aspects of the invention as described.

What is claimed is:

1. A rotary hammer comprising:
a housing including a chuck;
an anvil moveable axially within the housing; and
an adapter removably coupled to the chuck, the adapter including
an adapter housing,
an input shaft being axially movable relative to the adapter housing and having a first end and a second end opposite the first end, the first end extending outwardly from the adapter housing to receive axial force from the anvil, the second end configured to transmit the axial force from the anvil to the adapter housing, and a drill bit extending outwardly from the adapter housing and configured to impact a workpiece, wherein axial motion of the input shaft is imparted onto the adapter housing through the second end of the input shaft, and wherein the adapter housing imparts the axial motion onto the drill bit, wherein the input shaft defines an input axis, the drill bit defines an output axis, and the input axis is spaced from the output axis.

2. The rotary hammer of claim 1, wherein the input axis is parallel with the output axis.

3. The rotary hammer of claim 2, wherein the input axis is spaced between 1.5 inches and 2.5 inches from the output axis.

4. The rotary hammer of claim 1, wherein the chuck rotates the input shaft about the input shaft to also rotate the drill bit about the output axis.

5. The rotary hammer of claim 4, wherein the input shaft is coupled to the drill bit via a gear mechanism.

6. The rotary hammer of claim 5, wherein the gear mechanism includes an input gear coupled to the input shaft, an intermediate gear meshed with the input gear, and an output gear meshed with the intermediate gear and coupled to the drill bit.

7. The rotary hammer of claim 4, wherein the input shaft rotates in a direction that is the same as a direction of rotation of the drill bit.

8. An adapter for use with a power tool, the adapter comprising:

a housing;

an input shaft extending from the housing, the input shaft defining a first end, a second end opposite the first end, and an input axis extending between the first end and the second end, the first end spaced apart from the housing and configured to be inserted into the power tool such that the input shaft is coupled to the power tool via a chuck of the power tool to receive impacts from the power tool; and a drill bit having a first end and a second end opposite the first end, the first end contacting the housing, the second end extending from the housing, the drill bit defining an output axis and configured to receive the impacts from the input shaft, wherein the input axis is spaced apart from and parallel with the output axis, wherein the housing transmits the impacts received by the input shaft to the first end of the drill bit, wherein the input shaft includes a first portion extending from the first end toward the second end and a second portion extending from the first portion to the second end, the first portion positioned outside the housing and the second portion positioned within the housing, the first portion is longer than the second portion, and wherein a length of the first portion is longer than a length of the housing.

9. The adapter of claim 8, further comprising a gear mechanism positioned within the housing, wherein the input shaft is coupled to the drill bit via the gear mechanism.

10. The adapter of claim 9, wherein the gear mechanism includes an input gear coupled to the input shaft, an intermediate gear meshed with the input gear, and an output gear meshed with the intermediate gear and coupled to the drill bit.

11. An adapter for use with a power tool, the adapter comprising:

a housing having an output opening;

an input shaft extending from the housing, the input shaft defining a first end, a second end opposite the first end, and an input axis extending between the first end and the second end, the first end spaced apart from the housing and configured to be inserted into the power tool such that the input shaft is coupled to the power tool via a chuck of the power tool to receive axial impacts and rotary motion from the power tool; and a gear mechanism positioned within the housing, the gear mechanism including an input gear coupled to the input shaft and an output gear positioned proximate the output opening, the output gear having a bore configured to receive a drill bit such that the drill bit extends outwardly from the housing through the output opening, the output gear defining an output axis that is spaced apart from and parallel with the input axis, wherein the housing is configured to transmit the axial impacts from the power tool to the drill bit, and wherein the gear mechanism is configured to transmit rotary motion from the power tool to the drill bit, wherein the input shaft includes a first portion extending from the first end toward the second end and a second portion extending from the first portion to the second end, the first portion positioned outside the housing and the second portion positioned within the housing, the first portion is longer than the second portion, and wherein a length of the first portion is longer than a length of the housing.

12. The adapter of claim 11, wherein the gear mechanism includes an intermediate gear meshed with the input gear and the output gear.

13. The adapter of claim 11, wherein the input shaft rotates in a direction that is the same as a direction of rotation of the drill bit.

* * * * *